(12) United States Patent
Broesse et al.

(10) Patent No.: US 8,324,754 B2
(45) Date of Patent: Dec. 4, 2012

(54) SYSTEM FOR SUPPLYING VOLTAGE TO ELECTRICAL LOADS OF A MOTOR VEHICLE

(75) Inventors: Andreas Broesse, Munich (DE); Dieter Polenov, Munich (DE); Hartmut Proebstle, Augsburg (DE); Marcus Hafkemeyer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 426 days.

(21) Appl. No.: 12/364,794

(22) Filed: Feb. 3, 2009

(65) Prior Publication Data
US 2010/0001581 A1 Jan. 7, 2010

Related U.S. Application Data

(63) Continuation of application No. PCT/EP2007/006693, filed on Jul. 28, 2007.

(30) Foreign Application Priority Data

Aug. 4, 2006 (DE) .................... 10 2006 036 425

(51) Int. Cl.
 B60L 1/00 (2006.01)
 B60L 3/00 (2006.01)
 H02G 3/00 (2006.01)

(52) U.S. Cl. ........................ 307/9.1; 307/10.1

(58) Field of Classification Search .................... None
See application file for complete search history.

(56) References Cited

U.S. PATENT DOCUMENTS

| | | | | |
|---|---|---|---|---|
| 4,385,240 A | * | 5/1983 | Sato ............................. | 307/10.1 |
| 5,041,776 A | * | 8/1991 | Shirata et al. ................ | 322/29 |
| 5,572,108 A | * | 11/1996 | Windes ........................ | 320/167 |
| 5,811,960 A | * | 9/1998 | Van Sickle et al. ........... | 322/4 |

(Continued)

FOREIGN PATENT DOCUMENTS
DE 197 20 816 A1 11/1998
(Continued)

OTHER PUBLICATIONS

DE Patent 103 42 178 to Gebhardt—english translation, Apr. 21, 2005.*

(Continued)

Primary Examiner — Rexford N Barnie
Assistant Examiner — Justen Fauth
(74) Attorney, Agent, or Firm — Crowell & Moring LLP

(57) ABSTRACT

A system is provided for supplying voltage to electrical loads in the onboard electrical system of a motor vehicle, in which system the onboard electrical system includes at least two onboard electrical system regions. The first onboard electrical system region has an electric generator, a vehicle battery, and one or more first electrical loads, and the second onboard electrical system region has a double-layer capacitor or a so-called supercap, and one or more second electrical loads. A blocking apparatus, in particular a semiconductor diode or a circuit breaker, is provided between the two onboard electrical system regions. The blocking apparatus permits current to flow from the first onboard electrical system region to the second onboard electrical system region and largely prevents current from flowing in reverse from the second onboard electrical system region to the first onboard electrical system region. The output voltage of the electrical generator is increased and the supercap is charged when a first threshold value of the electrical voltage is undershot in the second onboard electrical system region.

15 Claims, 1 Drawing Sheet

U.S. PATENT DOCUMENTS

| | | | |
|---|---|---|---|
| 5,818,115 A * | 10/1998 | Nagao | 290/31 |
| 5,880,951 A | 3/1999 | Inaba | |
| 6,580,279 B1 * | 6/2003 | Baumgartner et al. | 324/678 |
| 2004/0119337 A1 | 6/2004 | Ketteler | |
| 2004/0204874 A1 * | 10/2004 | Hasuka et al. | 702/60 |
| 2005/0082095 A1 * | 4/2005 | Tamai et al. | 180/65.1 |
| 2007/0170896 A1 * | 7/2007 | Proebstle et al. | 322/37 |

FOREIGN PATENT DOCUMENTS

| | | |
|---|---|---|
| DE | 100 55 076 A1 | 6/2002 |
| DE | 101 49 111 A1 | 4/2003 |
| DE | 102 59 879 A1 | 7/2004 |
| DE | 103 42 178 A1 | 4/2005 |
| DE | 103 46 856 A1 | 5/2005 |
| DE | 10 2006 002 985 A1 | 8/2007 |
| EP | 1 405 767 A1 | 4/2004 |
| EP | 1405767 * | 4/2004 |

OTHER PUBLICATIONS

German Search Report dated Feb. 28, 2007 with English translation (Nine (9) pages).
International Search Report dated Mar. 27, 2008 with English translation (Six (6) pages).

* cited by examiner

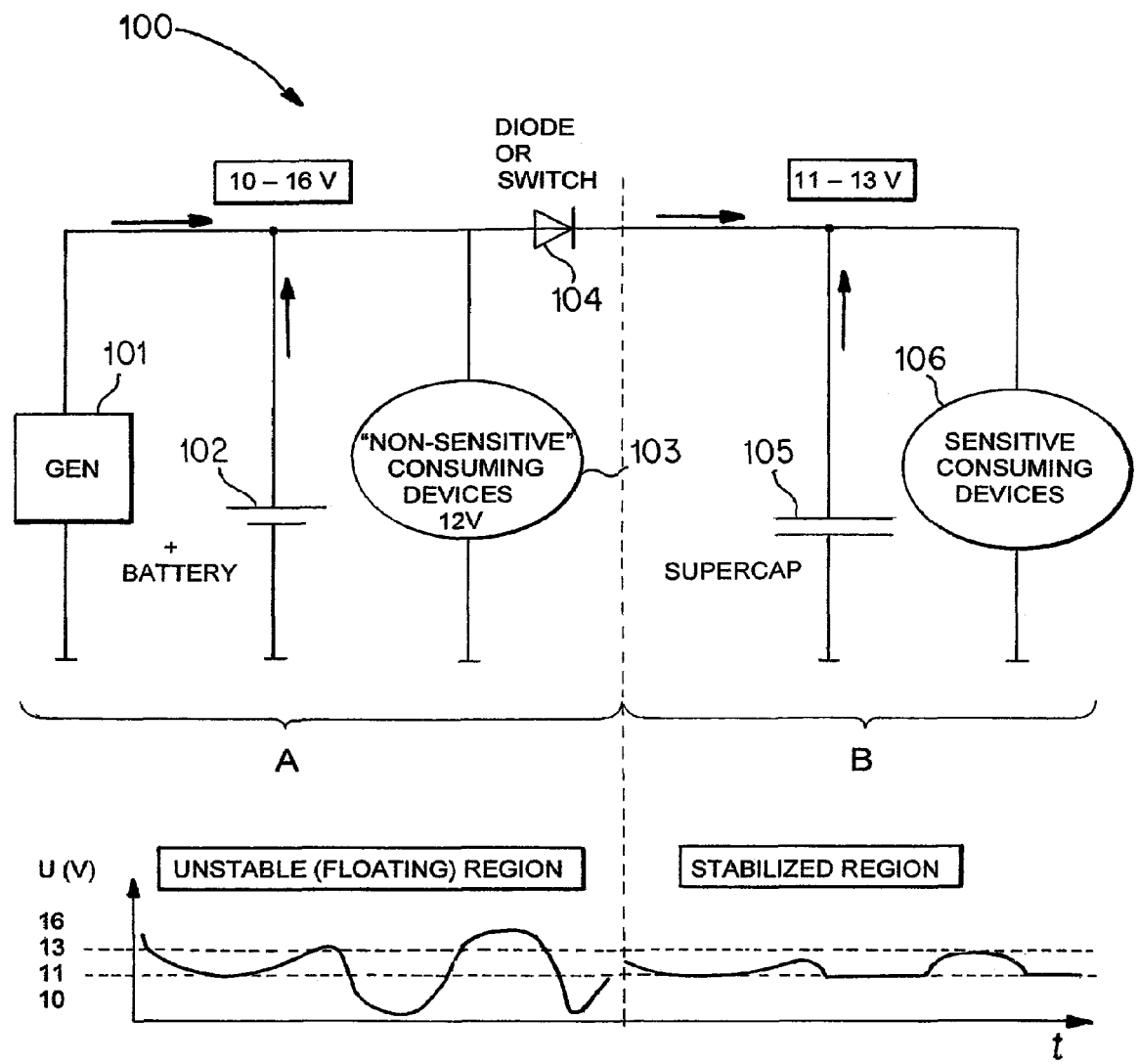

SYSTEM FOR SUPPLYING VOLTAGE TO ELECTRICAL LOADS OF A MOTOR VEHICLE

CROSS-REFERENCE TO RELATED APPLICATIONS

This application is a continuation of PCT International Application No. PCT/EP2007/006693, filed Jul. 28, 2007, which claims priority under 35 U.S.C. § 119 to German Patent Application No. DE 10 2006 036 425.2, filed Aug. 4, 2006, the entire disclosures of which are herein expressly incorporated by reference.

This application contains subject matter related to U.S. application Ser. No. 12/364,794, entitled "System and Method for Supplying Voltage to Electrical Loads of a Motor Vehicle by Using a Supercap," filed on even date herewith.

BACKGROUND AND SUMMARY OF THE INVENTION

The invention relates to a system for supplying voltage to electrical loads in the onboard electrical system of a motor vehicle.

In the case of known systems, the generator required for generating the voltage consumes a considerable amount of power, which has to be made available by the engine of the motor vehicle.

It is an object of the present invention to reduce the power to be provided by the motor vehicle engine for supplying the onboard electrical system of the motor vehicle with sufficient electric energy.

This object is achieved by a system for supplying the voltage to electrical loads in the onboard electrical system of a motor vehicle, wherein the onboard electrical system includes at least two onboard electrical system regions. The first onboard electrical system region has an electric generator, a vehicle battery, as well as one or more first electrical loads. The second onboard electrical system region has an energy accumulator, in particular, a capacitor, and one or more second electrical loads. Between the two onboard electrical system regions, a blocking device is provided, in particular, a semiconductor diode or a power switch, which permits a current flow from the first onboard electrical system region into the second onboard electrical system region and largely prevents a reverse current flow from the second onboard electrical system region into the first onboard electrical system region. The output voltage of the electric generator is raised and the capacitor is charged when there is a falling below a first threshold value of the electric voltage in the second onboard electrical system region. Advantageous embodiments of the invention are described herein.

According to the invention, the electrical loads in the onboard electrical system of a motor vehicle are divided into a group of at least two types of electrical loads. The first group of electrical (non-sensitive) loads will also operate reliably when there are relatively wide voltage fluctuations and/or when the voltage is relatively low; for example, when, in the case of a 12 volt onboard electrical system, the voltage falls below 10 volts and/or fluctuates between approximately 9 and 16 volts.

In contrast, the second group of electrical (sensitive) loads will operate reliably only when there are relatively slight voltage fluctuations about the nominal voltage; for example, when, in the case of a 12 volt onboard electrical system, the voltage fluctuates only between approximately 11 and 13 volts. According to the invention, the onboard electrical system is divided into at least two electrical system regions; the non-sensitive electrical loads are arranged in the first electrical system region, and the sensitive electrical loads are arranged in the second electrical system region.

A current flow from the second onboard electrical system region into the first onboard electrical system region, according to the invention, is largely prevented by a blocking device or circuit, preferably a semiconductor diode arranged between the first and the second electrical system regions. In the first onboard electrical system region, the electric generator and a vehicle battery are arranged in parallel to the first electrical loads, and in the second onboard electrical system region, an energy accumulator, a battery or a capacitor, preferably a double-layer capacitor or a so-called supercap, is arranged in parallel to the second electrical loads. During operation of the motor vehicle, the double-layer capacitor is regularly charged to a voltage which keeps the sensitive second electrical loads ready to operate while the capacitor discharges.

During the phases in which the double-layer capacitor does not have to be charged, the voltage of the generator is reduced to such an extent that the operational readiness of the first electrical loads (still) exists (see DE 2006 002 985). In this case, the voltage at the double-layer capacitor is higher than at the first (non-sensitive) loads, and the blocking device or diode prevents the discharge of the double-layer capacitor by way of the loads of the first onboard electrical system region. Inversely, the blocking device permits an electric current flow from the electric generator by way of the blocking device or diode into the second onboard electrical system region when the output voltage of the generator is raised in order to charge the double-layer capacitor.

The monitoring of the charge condition or of the output voltage of the double-layer capacitor takes place by way of a charge control device, which controls the generator such that, when the capacitor voltage falls below a threshold voltage, the generator increases the voltage for charging the capacitor and then subsequently reduces the voltage again.

In contrast to the known state of the art, the generator can be controlled such that, during operation of the motor vehicle, it predominantly provides only a lower voltage for operating the non-sensitive loads. In the case of the known state of the art, it was, however, necessary to increase the voltage to such an extent and duration that even the sensitive loads always had a sufficient operating voltage available.

Thus, according to the invention, the power consumption of the generator can be reduced for long periods of time and the fuel consumption and the $CO_2$ emission of the motor vehicle can thereby clearly be reduced.

In a preferred embodiment of the invention, the time duration and/or the amount by which the electric voltage is raised in the second onboard electrical system region is a function of the energy consumption of one or more second electrical loads and/or of the capacitance of the capacitor in the second onboard electrical system region.

As an alternative or in addition, it is provided in a further preferred embodiment of the invention that the time duration and/or the raised voltage amount is proportional to the energy consumption of the one or more second electrical loads and/or proportional to the capacitance of the capacitor.

As a result of these measures, the charging operation can be optimized, particularly with respect to a further reduction of the $CO_2$ emission.

In another preferred embodiment of the invention, it is provided that, for their operation, the first electrical loads require an operating voltage which is in a first voltage range and, for their operation, the second electrical loads require an operating voltage which is in a second operating range. The second voltage range preferably is narrower than the first voltage range; i.e., in contrast to the first electrical loads, the second electrical loads are so-called sensitive electrical loads of the motor vehicle.

As an alternative or in addition, it is provided in a preferred embodiment of the invention that the non-sensitive first electrical loads are largely provided in the first onboard electrical system region and the sensitive second electrical loads are largely provided in the second onboard electrical system region of the motor vehicle.

As a result of this measure, the invention can be technically implemented in a particularly simple manner.

In the case of a concrete embodiment of the invention for a classic 12 volt onboard electrical system, the voltage range predominant in the first onboard electrical system region during the operation of the vehicle comprises a voltage of approximately 10 to 16 volts, and the voltage range predominant in the second onboard electrical system region during the operation of the vehicle comprises a voltage of approximately 11 to 13 volts.

In a further embodiment of the invention, it is provided that, after the operation of the vehicle, the capacitor is separated from the second onboard electrical system region, is then preferably discharged and charged again during another operation of the vehicle, and is electrically connected with the onboard electrical system region and is charged.

As a result, the reliability of the onboard electrical system is increased in the event of short circuits, and the high quiescent current of supercapacitors (supercaps or SCs) is avoided in the stationary phases. The precharging and the coupling/uncoupling of the supercap to/from the onboard electrical system preferably takes place by a separate control/power unit which, preferably simultaneously, carries out the diagnosis of the SC (such as the determination of the capacitance and resistance during the precharging operation).

In a preferred embodiment of the invention, it is provided that the accumulator in the second electrical system is a battery or, preferably, a capacitor such as a double-layer capacitor or a so-called supercap.

Such capacitors are distinguished by high charge densities, so that high capacitances can be provided while keeping the dimensions small. Further, such capacitors can be charged rapidly at high currents, which is advantageous with respect to a reduction of $CO_2$.

Other objects, advantages and novel features of the present invention will become apparent from the following detailed description of one or more preferred embodiments when considered in conjunction with the accompanying drawings.

BRIEF DESCRIPTION OF THE DRAWING

FIG. 1 is a schematic diagram of an onboard electrical electrical system including two onboard electrical system regions, which are electrically connected with one another by way of a diode, as well as a graphical representation of voltage fluctuations over time.

DETAILED DESCRIPTION OF THE DRAWING

The system according to the invention or the onboard electrical system 100 according to the invention for supplying voltage to electrical loads 103 and 106 consists of two onboard electrical system regions A and B. The first onboard electrical system region A has an electric generator 101, a vehicle battery 102 and one or more first electrical loads 103. The second onboard electrical system region B has an energy accumulator in the form of a capacitor or supercap 105 and one or more second electrical loads 106.

Between the two onboard electrical system regions A and B, a blocking device 104 is provided in the form of a semiconductor diode, which permits current to flow from the first onboard electrical system region A into the second electrical system region B and largely prevents a reverse current flow from the second onboard electrical system region B into the first onboard electrical system region A.

The output voltage of the electric generator 101 is raised and the energy accumulator or capacitor 105 is charged when a first threshold value of the electric voltage in the second onboard electrical system region B is undershot.

For their operation, the first electrical loads 103 require an operating voltage which is in a first voltage range of from 10 to 16 volts; i.e., they are so-called "non-sensitive" loads. For their operation, the second electrical loads 106 require an operating voltage which is within a second voltage range of from 11 to 13 volts; i.e., they are so-called "sensitive" loads.

As schematically illustrated in FIG. 1 by the graph "Voltage as a Function of the Time", the first onboard electrical system region A is characterized by relatively high voltage fluctuations between approximately 10 and 16 volts (unstable or fluctuating range). In contrast, the second onboard electrical system region B is characterized by relatively low voltage fluctuations between 11 and 13 volts (stabilized range).

The method of operation and the advantages of the system according to the invention were described above, so that at this point only reference is made to the above.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for supplying voltage to electrical loads in an onboard vehicle electrical system, the system comprising:
    a first onboard electrical system region of the onboard vehicle electrical system, the first region having an electric generator, a vehicle battery, and one or more first electrical loads;
    a second onboard electrical system region of the onboard vehicle electrical system, the second region having an energy accumulator and one or more second electrical loads;
    a current blocking apparatus operatively configured between the first and second regions for permitting current to flow from the first region into the second region and largely preventing current from flowing in reverse from the second region into the first region; and
    wherein an output voltage of the electric generator is raised and the energy accumulator in the second region is charged by the electric generator in the first region, as a result of and in response to, a first threshold value of the electric voltage being undershot in the second region.

2. The system according to claim 1, wherein the energy accumulator comprises a capacitor and the current blocking device comprises a semiconductor diode or a power switch.

3. The system according to claim 2, wherein at least one of a time duration and an increased amount of the electric voltage in the second region is a function of energy consumption of at least one of said one or more second electrical loads and a capacitance of the capacitor in the second region.

4. The system according to claim 3, wherein the time duration and/or the increased amount of the electric voltage in the second region is proportional to the energy consumption of the one or more second electrical loads and/or the capacitance of the capacitor.

5. The system according to claim 2, wherein, after operating the vehicle, the capacitor is separated from the second region and, during operation of the vehicle, the capacitor is recharged to a voltage of the onboard vehicle electrical system and then electrically coupled to the second region.

6. The system according to claim 5, wherein the capacitor is one of a double-layer capacitor and a supercap.

7. The system according to claim 5, further comprising a separate control/power unit operatively configured to precharge and/or couple or separate the capacitor to/from the onboard vehicle electrical system.

8. The system according to claim 7, wherein the separate control/power unit is operatively configured to diagnose the capacitor during precharging.

9. The system according to claim 8, wherein the diagnosis of the capacitor during precharging determines at least one of a capacitance and a resistance of the capacitor.

10. The system according to claim 2, wherein the capacitor is one of a double-layer capacitor and a supercap.

11. The system according to claim 1, wherein operation of the first electrical loads require an operating voltage in a first voltage range and operation of the second electrical loads require an operating voltage in a second voltage range, said second voltage range being narrower than said first voltage range.

12. The system according to claim 11, wherein the first electrical loads operating in the first voltage range are non-sensitive first electrical loads and are largely provided in the first region, and the second electrical loads operating in the second voltage range are sensitive electrical loads largely provided in the second region of the onboard vehicle electrical system.

13. The system according to claim 11, wherein a voltage range predominant in the first region during operation of the motor vehicle comprises a voltage range of approximately 10 to 16 volts, and a voltage range predominant in the second region during operation of the motor vehicle comprises a voltage range of approximately 11 to 13 volts.

14. The system according to claim 1, wherein a voltage range predominant in the first region during operation of the motor vehicle comprises a voltage range of approximately 10 to 16 volts, and a voltage range predominant in the second region during operation of the motor vehicle comprises a voltage range of approximately 11 to 13 volts.

15. The system according to claim 1, wherein the energy accumulator is a battery.

* * * * *